(12) United States Patent
Nobuhira

(10) Patent No.: US 7,882,911 B2
(45) Date of Patent: Feb. 8, 2011

(54) STRADDLE TYPE VEHICLE INCLUDING AIR EXHAUST DUCT FOR CONTINUOUSLY VARIABLE TRANSMISSION

(75) Inventor: Takayuki Nobuhira, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 37 days.

(21) Appl. No.: 12/193,883

(22) Filed: Aug. 19, 2008

(65) Prior Publication Data

US 2009/0050391 A1 Feb. 26, 2009

(30) Foreign Application Priority Data

Aug. 20, 2007 (JP) .............................. 2007-214105

(51) Int. Cl.
*B62M 7/02* (2006.01)
*B62M 9/10* (2006.01)

(52) U.S. Cl. ..................... 180/68.1; 180/229; 180/230; 180/339

(58) Field of Classification Search .................. 180/219, 180/231, 339, 68.1, 68.2, 229, 230; 474/93, 474/146

See application file for complete search history.

(56) References Cited

U.S. PATENT DOCUMENTS

| | | | | |
|---|---|---|---|---|
| 4,159,035 A * | 6/1979 | Chartet | ........................ | 165/173 |
| 4,697,665 A * | 10/1987 | Eastman et al. | ............. | 180/230 |
| 4,708,699 A * | 11/1987 | Takano et al. | ................ | 474/144 |
| 4,744,432 A * | 5/1988 | Shibata et al. | .............. | 180/68.1 |
| 5,976,044 A * | 11/1999 | Kuyama | ....................... | 474/93 |
| 6,705,417 B2 * | 3/2004 | Kitai et al. | .................. | 180/68.1 |
| 6,938,676 B2 * | 9/2005 | Lan et al. | ....................... | 165/41 |
| 7,059,438 B1 * | 6/2006 | Sheets | ......................... | 180/68.1 |
| 2002/0134598 A1 * | 9/2002 | Nakamura et al. | .......... | 180/68.1 |
| 2003/0029656 A1 * | 2/2003 | Matsuura et al. | ............ | 180/68.2 |
| 2003/0066696 A1 * | 4/2003 | Nakamura | ................... | 180/68.1 |
| 2004/0040533 A1 * | 3/2004 | Laimboeck | ............... | 123/197.1 |
| 2004/0195018 A1 * | 10/2004 | Inui et al. | ................... | 180/68.1 |
| 2006/0011401 A1 * | 1/2006 | Nakamura et al. | ........... | 180/309 |
| 2006/0066092 A1 * | 3/2006 | Miyabe | ....................... | 280/833 |
| 2006/0270503 A1 * | 11/2006 | Suzuki et al. | ................ | 474/144 |
| 2007/0023220 A1 * | 2/2007 | Ishida et al. | ................. | 180/229 |
| 2007/0215404 A1 * | 9/2007 | Lan et al. | ..................... | 180/339 |

FOREIGN PATENT DOCUMENTS

| | | | | |
|---|---|---|---|---|
| GB | 2114945 | A | * | 9/1983 |
| JP | 61211134 | A | * | 9/1986 |
| JP | 62105719 | A | * | 5/1987 |
| JP | 63130429 | A | * | 6/1988 |
| JP | 02092792 | A | * | 4/1990 |
| JP | 04257783 | A | * | 9/1992 |
| JP | 2002-019669 | | | 1/2002 |

* cited by examiner

*Primary Examiner*—Lesley Morris
*Assistant Examiner*—Wesley Potter
(74) *Attorney, Agent, or Firm*—Keating & Bennett, LLP

(57) ABSTRACT

A straddle-type vehicle with enhanced heat exhaust efficiency in a transmission case housing a continuously variable transmission. The continuously variable transmission and an engine are arranged forward of a rear wheel 4. An air intake duct introduces outside air into the transmission case and an air exhaust duct exhausts air from the transmission case. The air exhaust duct is connected to and extends upward from a top portion of the transmission case. The air exhaust duct has an air exhaust port that is positioned above the transmission case.

12 Claims, 14 Drawing Sheets

STRADDLE TYPE VEHICLE INCLUDING AIR EXHAUST DUCT FOR CONTINUOUSLY VARIABLE TRANSMISSION

RELATED APPLICATIONS

This application claims the benefit of priority under 35 USC 119 of Japanese patent application no. 2007-214105, filed on Aug. 20, 2007, which application is hereby incorporated by reference in its entirety.

BACKGROUND OF THE INVENTION

1. Field of the Invention

The present invention relates to a technology for cooling a continuously variable transmission in a straddle-type vehicle such as a motorcycle.

2. Description of Related Art

A straddle-type vehicle in which a belt-type continuously variable transmission and an engine are both arranged forward of a rear wheel has been proposed, for example, in Japanese Unexamined Patent Publication No. 2002-19669. In the continuously variable transmission of Japanese Unexamined Patent Publication No. 2002-19669, the spacing between a driving side pulley and a driven side pulley is small and hence it is difficult to lower the temperature of a belt looped around the driving and driven side pulleys. For this reason, outside air is introduced into a case for housing the continuously variable transmission.

However, in the straddle-type vehicle of Japanese Unexamined Patent Publication No. 2002-19669, an air exhaust passage is extended downward along a side of the case, so that air warmed in the case is exhausted downward. Thus, excellent heat exhaust efficiency is not acquired.

SUMMARY OF THE INVENTION

The present invention addresses these problems and provides a straddle-type vehicle that enhances heat exhaust efficiency in a case for housing a continuously variable transmission.

A straddle-type vehicle according to the present invention includes a belt-type continuously variable transmission and an engine arranged forward of a rear wheel. A transmission case houses the continuously variable transmission. An air intake duct introduces outside air into the transmission case and an air exhaust duct exhausts air from the transmission case. The air exhaust duct is connected to and extends upward from a top portion of the transmission case, and has an air exhaust port positioned above the transmission case.

According to the present invention, air warmed in the transmission case is exhausted through the air exhaust duct that is connected to and extends upward from the top portion of the transmission case, so that air is exhausted with high efficiency and heat exhaust efficiency is enhanced.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
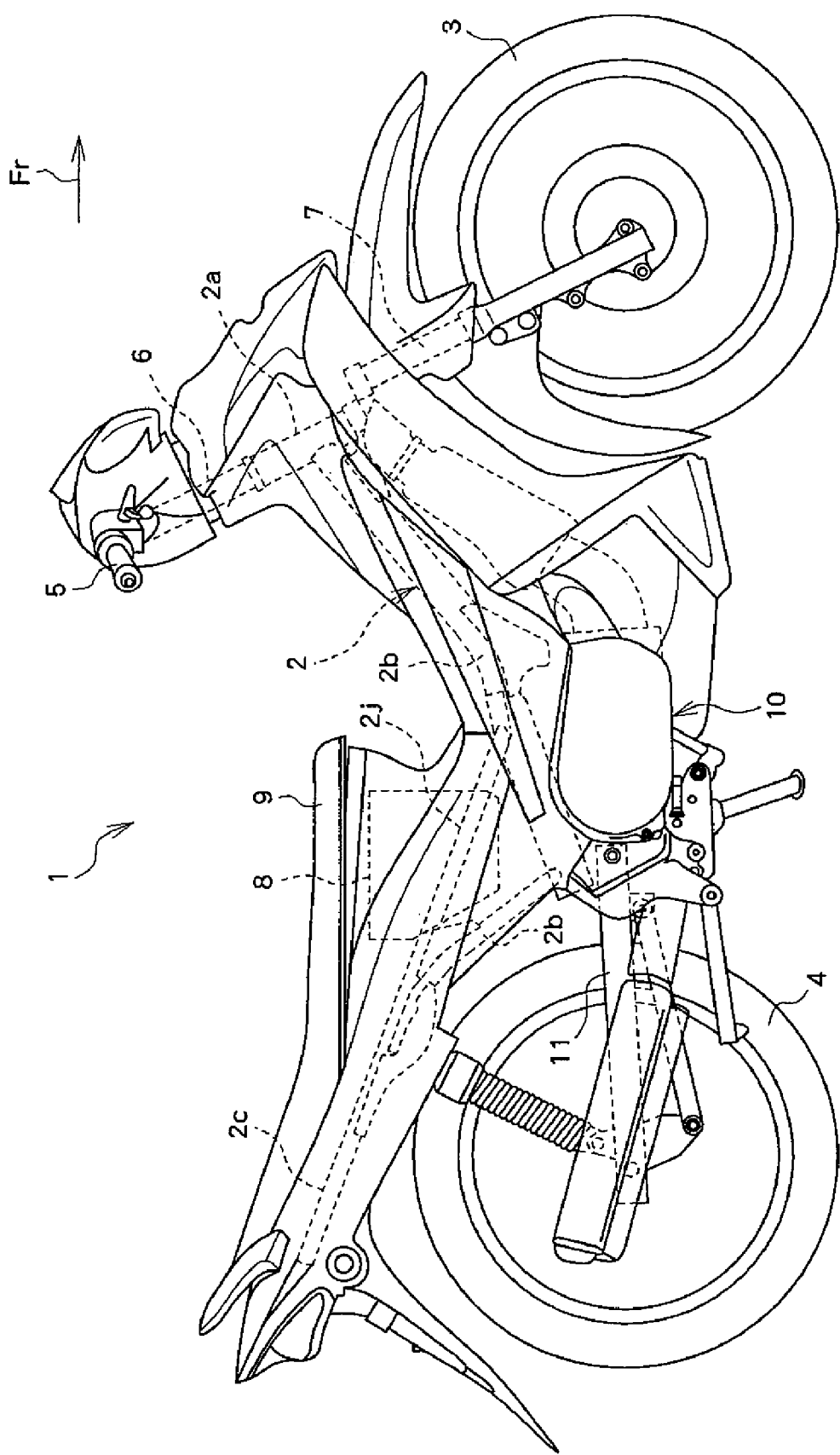
FIG. 1 is a side view of a motorcycle according to one embodiment of the present invention.
Figure 2:
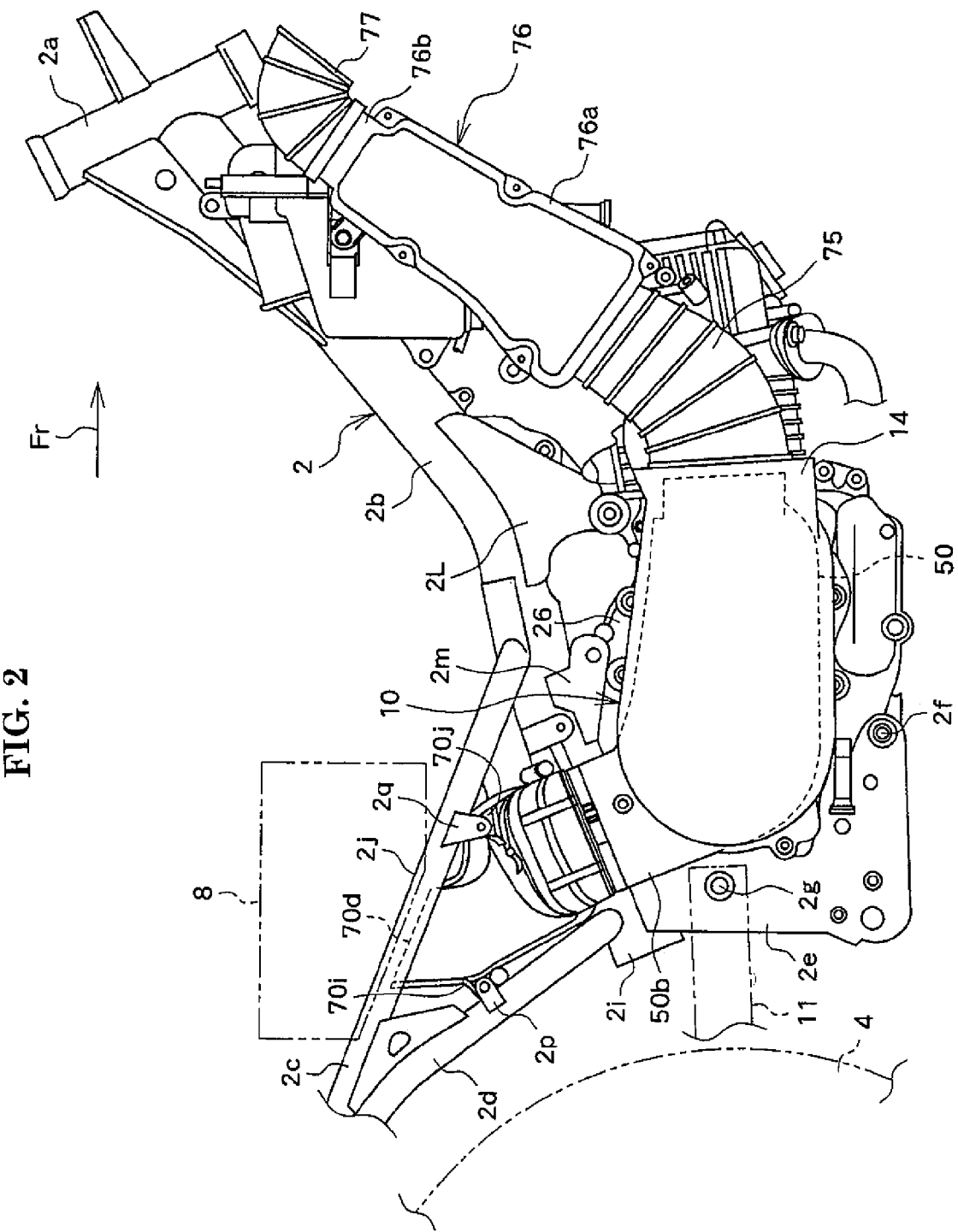
FIG. 2 is a side view of an engine unit and a vehicle body frame of the motorcycle.
Figure 3:
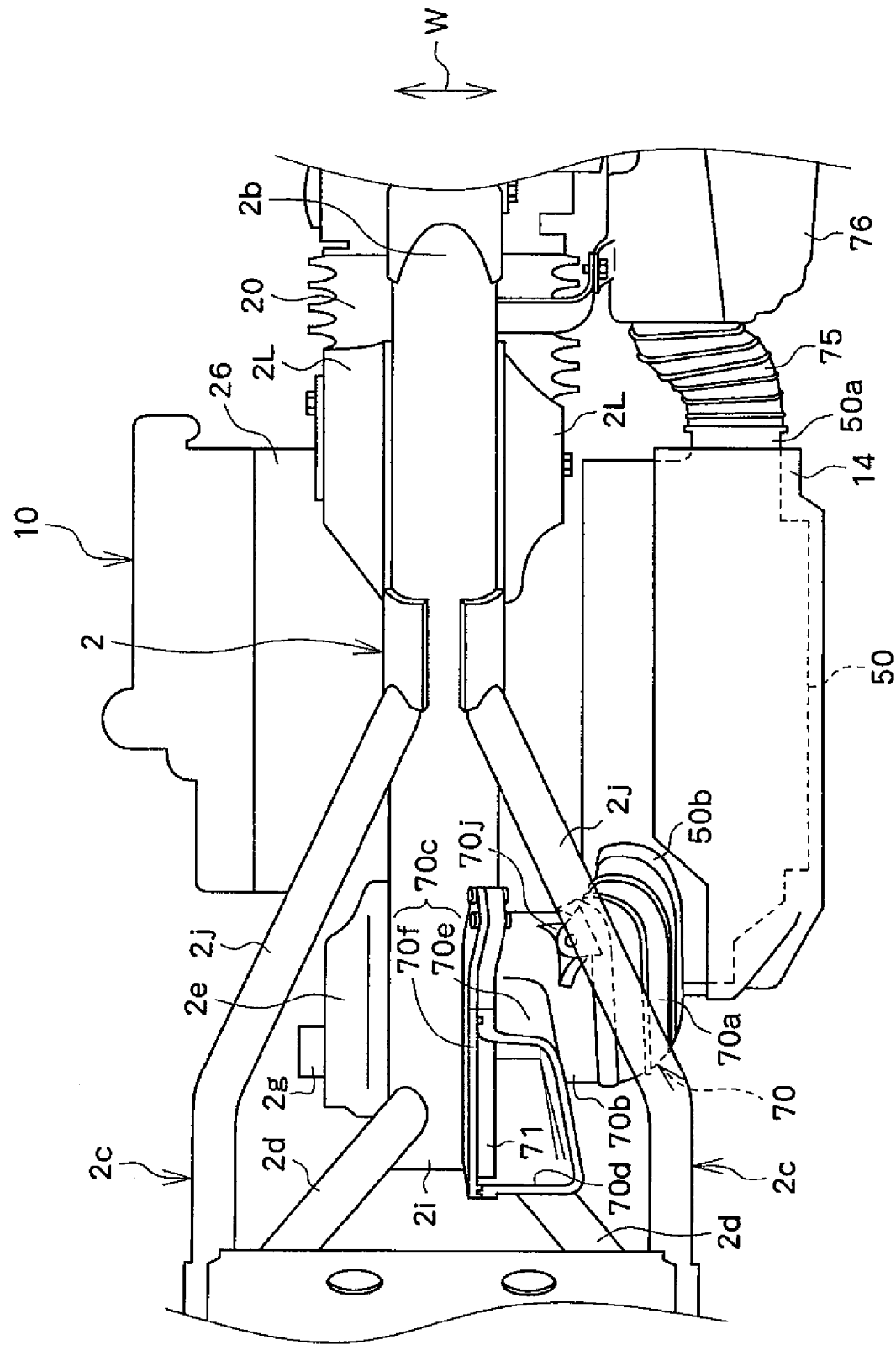
FIG. 3 is a plan view of the engine unit and the vehicle body frame.
Figure 4:
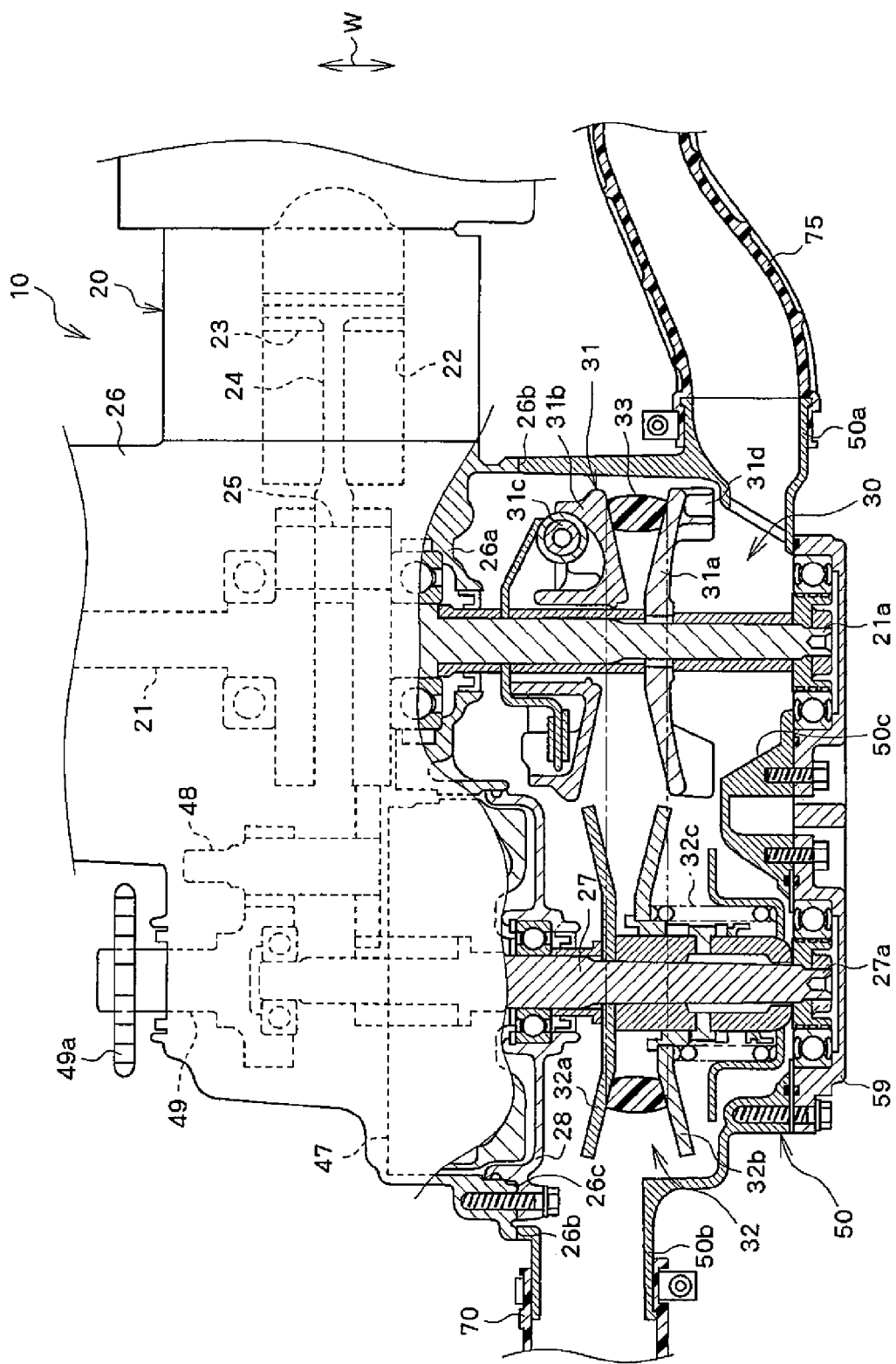
FIG. 4 is a partial sectional view of the engine unit and a front view of a handlebar of the motorcycle.
Figure 5:
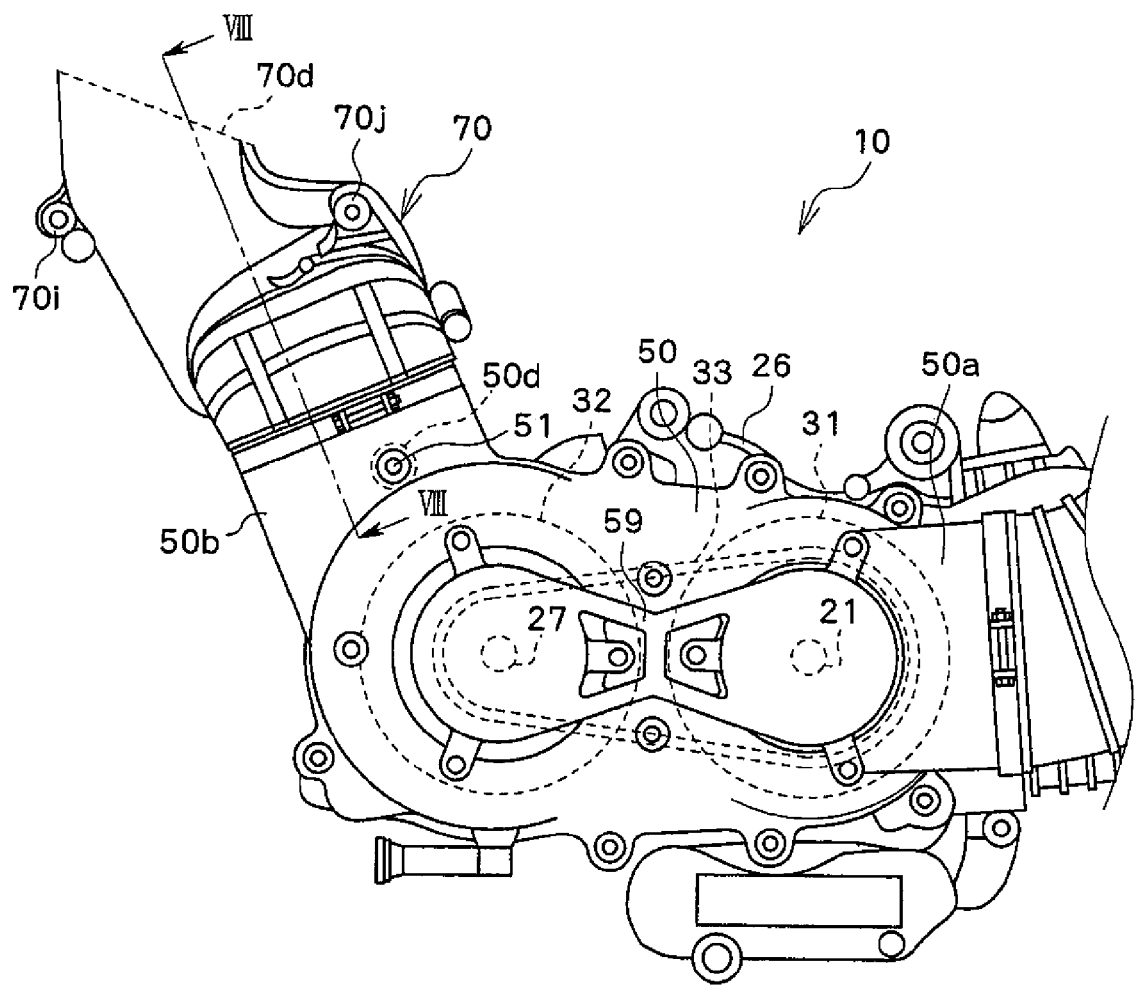
FIG. 5 is a side view of a transmission case of the engine unit.

An embodiment of the invention is now described with reference to the drawings. FIG. 1 is a side view of a motorcycle 1 as an example of a straddle-type vehicle according to an embodiment of the invention. A straddle-type vehicle may include, for example, a motorcycle (including a scooter), a four-wheel buggy and a snow mobile. FIG. 2 is a side view of an engine unit 10 and a vehicle body frame 2 of motorcycle 1. FIG. 3 is a plan view of engine unit 10 and vehicle body frame 2. FIG. 4 is a partial sectional view of engine unit 10. FIG. 5 is a side view of a transmission case 50 of engine unit 10.

As shown in FIG. 1, motorcycle 1 includes engine unit 10 and vehicle body frame 2. As shown in FIGS. 2 and 3, vehicle body frame 2 includes a steering head 2a, a main frame 2b, and left and right seat rails 2c, 2c, stays 2d, 2d and brackets 2e, 2e. Right side bracket 2e is shown in FIG. 2, and left side bracket 2e is shown in FIG. 3.

Steering head 2a is fixed to a front end portion of vehicle body frame 2 and rotatably supports a steering shaft 6 (FIG. 1). A handlebar 5 is connected to a top end portion of steering shaft 6. A front fork 7 is connected to a bottom end portion of steering shaft 6. The bottom end portion of front fork 7 supports a front wheel 3.

As shown in FIG. 2, a front end portion of main frame 2b is connected to steering head 2a. Main frame 2b slants downward toward a rear portion of motorcycle 1 from its front end portion, and its rear (bottom) end portion 2i is positioned in front of a rear wheel 4.

As shown in FIG. 2, a front end portion of seat rail 2c is connected to main frame 2b. Seat rail 2c slants upward toward the rear portion of motorcycle 1 from its front end portion, and front portion 2j of seat rail 2c extends outward in a vehicle width direction from its front end portion (direction W in FIG. 3). A storage case 8 for storing goods (for example, goods carried by an occupant) is arranged between front portions 2j, 2j, and a seat 9 on which the occupant sits is arranged above storage case 8 (FIG. 1). Seat rails 2c, 2c support storage case 8 and seat 9.

As shown in FIG. 2, a front end portion of stay 2d is connected to rear end portion 2i of main frame 2b. Stay 2d slants upward from its front end portion, and its top end portion is connected to a middle portion of seat rail 2c.

Bracket 2e is a plate-shaped part and has its top edge portion fixed to rear end portion 2i of main frame 2b. Bracket 2e extends downward from its top edge portion. As shown in FIG. 2, a top portion of bracket 2e has a support portion 2g for supporting a pivot shaft. The pivot shaft has a front end portion of a rear arm 11 fixed thereto. Rear arm 11 extends rearward, and its rear end portion supports an axle of rear wheel 4. Rear arm 11 swings on the pivot shaft along with rear wheel 4 independently of engine unit 10.

As shown in FIGS. 1 and 2, engine unit 10 is arranged in front of rear wheel 4 and is supported by vehicle body frame 2. Bracket 2e has a portion 2f, to which something is fixed, on a front side of its lower portion. Brackets 2L, 2m extend downward from and are fixed to a middle portion of main frame 2b. A top wall of a front portion of a crankcase 26 of engine unit 10 is fixed to bracket 2L, and a top wall of a rear portion of crankcase 26 is fixed to bracket 2m. A bottom portion of crankcase 26 is fixed to portion 2f of bracket 2e.

As shown in FIG. 4, engine unit 10 includes an engine 20 and a continuously variable transmission 30. Engine unit 10 also includes a transmission case 50 for housing continuously variable transmission 30; an air intake duct 75 for sending air to transmission case 50; an air cleaner 76 for cleaning air to be sent to transmission case 50; and an air exhaust duct 70 for exhausting air in transmission case 50 (FIG. 2). As shown in FIGS. 2 and 3, a cover 14 covers a side of transmission case 50.

Engine 20 includes a crankshaft 21, a cylinder 22, a piston 23 and crankcase 26. Piston 23 is arranged in cylinder 22 and is coupled to a crankpin 25 fixed to crankshaft 21 via a connecting rod 24. When an air-fuel mixture of fuel and air sent into cylinder 22 is combusted, piston 23 is reciprocated in cylinder 22. The reciprocating motion of piston 23 is converted to rotational motion by crankshaft 21 and is outputted to a downstream side of a transmission path of drive force. Crankshaft 21 extends in the vehicle width direction (direction W in FIG. 4) and is supported by crankcase 26. A driving side pulley 31 of continuously variable transmission 30 rotating with crankshaft 21 is mounted on crankshaft 21.

Continuously variable transmission 30 is arranged outside in the vehicle width direction of crankcase 26. Continuously variable transmission 30 includes a driving side pulley 31 and a driven side pulley 32. Driving side pulley 31 includes a fixed sheave 31a whose axial movement is restricted; a movable sheave 31b whose axial movement is allowed; and a weight roller 31c that is moved in the radial direction by centrifugal force and that pushes movable sheave 31b to the fixed sheave 31a side. Fixed sheave 31a has a fan 31d formed thereon that is erected outside in the vehicle width direction. When fan 31d is rotated, outside air is introduced into transmission case 50 from an air intake duct 75.

Driven side pulley 32 is mounted on a driven shaft 27 arranged rearward of crankshaft 21 and is rotated with driven shaft 27. Driven side pulley 32 includes a fixed sheave 32a whose axial movement is restricted; a movable sheave 32b whose axial movement is allowed; and a spring 32c for biasing movable sheave 32b to the fixed sheave 32a side. A belt (for example, a resin belt) 33 for transmitting torque from driving side pulley 31 to driven side pulley 32 is looped around driving side pulley 31 and driven side pulley 32. In this regard, crankshaft 21 and driven shaft 27 extend in the vehicle width direction in transmission case 50, and their end portions 21a, 27a are supported by a support part 59 fixed to the outside wall of transmission case 50.

Continuously variable transmission 30 reduces rotation of crankshaft 21 and transmits the reduced rotation to driven shaft 27. Movable sheave 31b of driving side pulley 31 is pressed by weight roller 31c and is brought near to the fixed sheave 31a side according to the rotation speed of crankshaft 21. On the other hand, movable sheave 32b of driven side pulley 32 is separated from fixed sheave 32a against the biasing force of spring 32c. In this manner, the diameters of portions of belt 33 that are looped around driving side pulley 31 and driven side pulley 32 are varied, whereby a speed reduction ratio is continuously varied.

Rotation transmitted to driven shaft 27 from driven side pulley 32 is transmitted to an output shaft 49 arranged coaxially with driven shaft 27 via an automatic clutch 47 mounted on driven shaft 27 and via an intermediate shaft 48 arranged forward of driven shaft 27. Rotation of a sprocket 49a mounted on output shaft 49 is transmitted to a sprocket rotated with axle 4a of rear wheel 4 via a chain.

As shown in FIG. 4, transmission case 50 is fixed to an edge 26b of crankcase 26 and houses continuously variable transmission 30. Driving side pulley 31 is arranged in the front portion of transmission case 50, and a driven side pulley 32 is arranged in the rear portion of transmission case 50. The front portion of transmission case 50 and the interior of crankcase 26 are partitioned by a partition wall 26a for supporting crankshaft 21. Moreover, the rear portion of transmission case 50 and the interior of crankcase 26 are partitioned by a partition part 28 fixed to edge 26c of crankcase 26.

Figure 6:
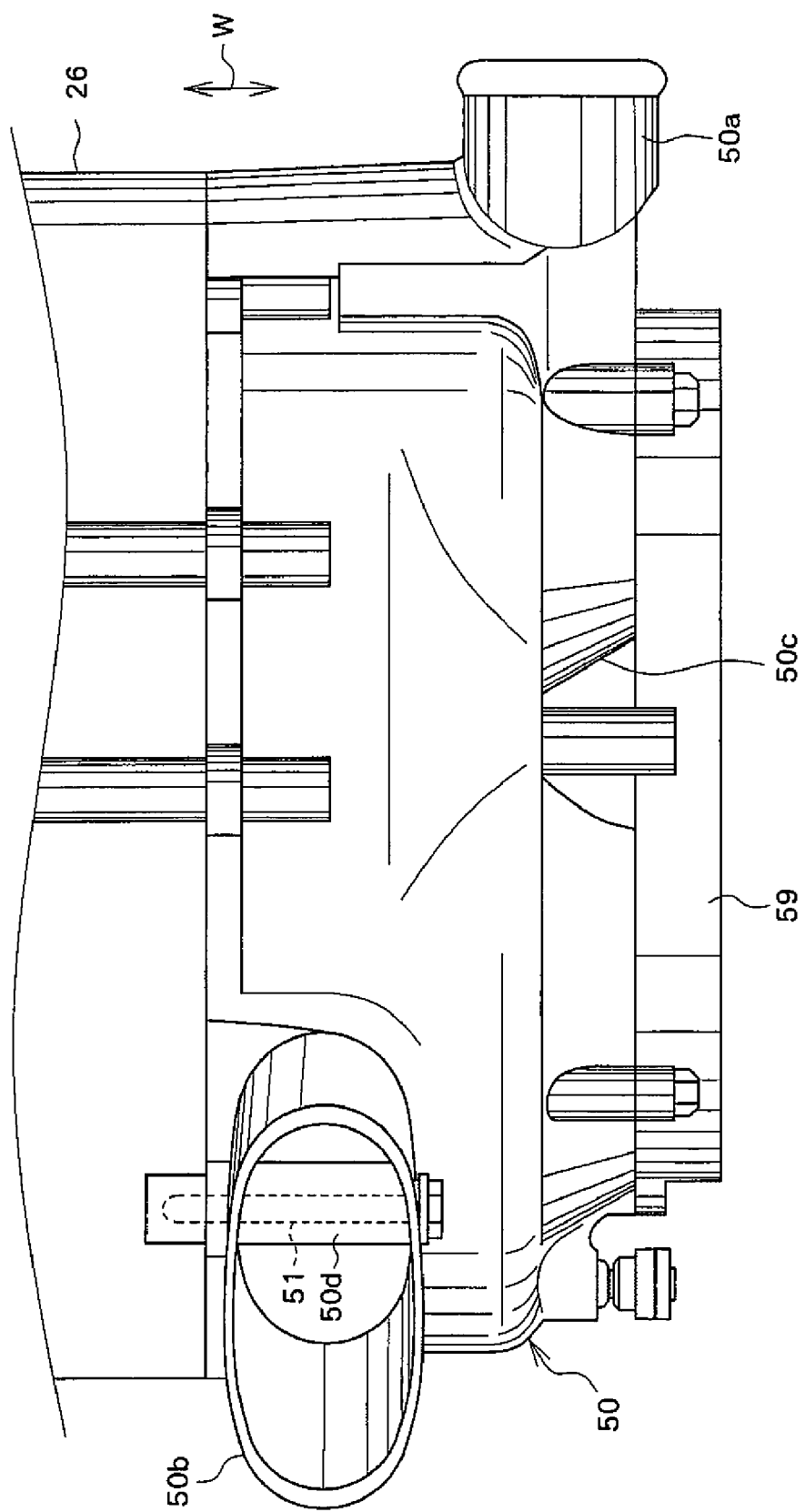
FIG. 6 is a plan view of the transmission case of the engine unit.

FIG. 5 is a side view of transmission case 50. FIG. 6 is a plan view of transmission case 50. As shown in FIGS. 5 and 6, transmission case 50 has an air intake side end connection 50a formed in a cylindrical shape and an air exhaust side end connection 50b similarly formed in a cylindrical shape.

Air intake side end connection 50a protrudes forward from the front portion of transmission case 50. As shown in FIG. 4, a bulging portion 50c bulging in the vehicle width direction is formed in the front portion of transmission case 50, and air intake side end connection 50a protrudes forward from bulging portion 50c. Air intake side end connection 50a is positioned outward in the vehicle width direction of fan 31d formed on driving side pulley 31.

Air intake duct 75 is connected to air intake side end connection 50a. As shown in FIG. 2, air intake duct 75 slants upward from air intake side end connection 50a and has an air cleaner 76 fixed to its top end portion. Air cleaner 76 includes an elongated and rectangular case 76a that slants upward. A tip duct 77 fixed to a top end portion 76b of case 76a is bent forward, and its tip portion is open forward.

As shown in FIG. 5, air exhaust side end connection 50b is mounted on and protrudes forward from a top portion on the rear side of transmission case 50. Air exhaust side end connection 50b is arranged above driven side pulley 32 and slants rearward. As shown in FIG. 6, air exhaust side end connection 50b has its section formed in an elliptic shape, and its long axis is directed in the front-and-rear direction of motorcycle 1.

As shown in FIG. 4, air exhaust side end connection 50b and air intake side end connection 50a are arranged opposite to each other across belt 33 of continuously variable transmission 30. Air intake side end connection 50a is arranged at an outermost position in the vehicle width direction in transmission case 50 and protrudes forward from bulging portion 50c, and air exhaust side end connection 50b is arranged at a position that is the closest to the center in the vehicle width direction in transmission case 50.

As shown in FIG. 6, a reinforcing part 50d extending in a direction intersecting a direction in which air exhaust side end connection 50b extends (a slanted upward direction) is disposed inside of and internally reinforces air exhaust side end connection 50b. Reinforcing part 50d extends in the vehicle width direction and is bridged between a surface positioned outside in the vehicle width direction and a surface positioned on the central side in the vehicle width direction of the inside peripheral surface of air exhaust side end connection 50*b*. Bolt holes are formed in reinforcing part 50*d* and in the outside wall of crankcase 26 at a position corresponding to reinforcing part 50*d*. A bolt 51 is fitted in these bolt holes to fix transmission case 50 to crankcase 26.

As shown in FIG. 5, air exhaust duct 70 is connected to and extends upward from air exhaust side end connection 50*b*. Air exhaust port 70*d* of air exhaust duct 70 is arranged above transmission case 50. Air exhaust duct 70 is bent at a middle portion thereof, and air exhaust port 70*d* is arranged at a position shifted to the side with respect to air exhaust side end connection 50*b* of transmission case 50.

Figure 7:
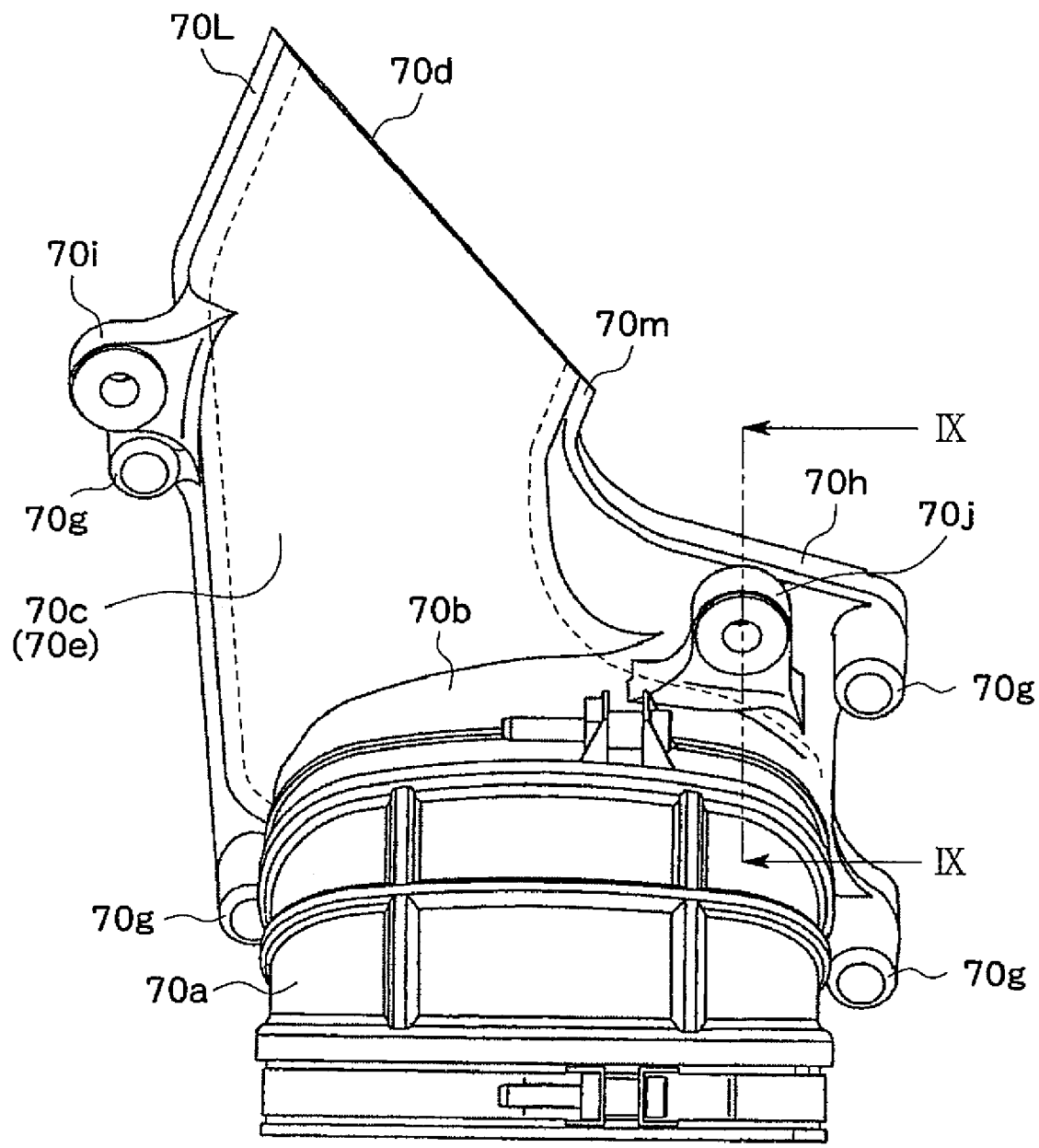
FIG. 7 is a side view of an air exhaust duct of the engine unit.
Figure 8:
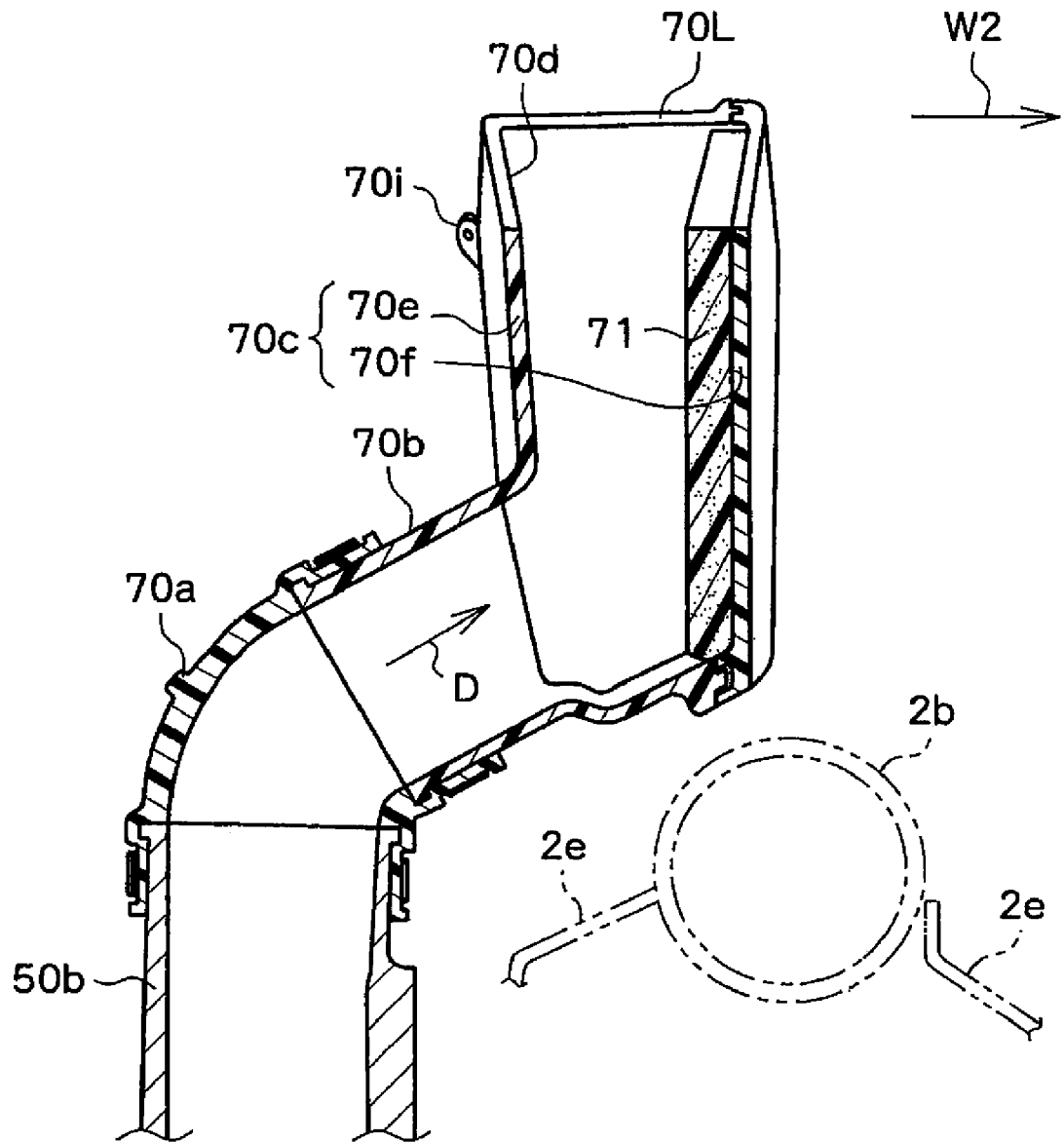
FIG. 8 is a sectional view taken along line VIII-VIII of FIG. 5.
Figure 9:
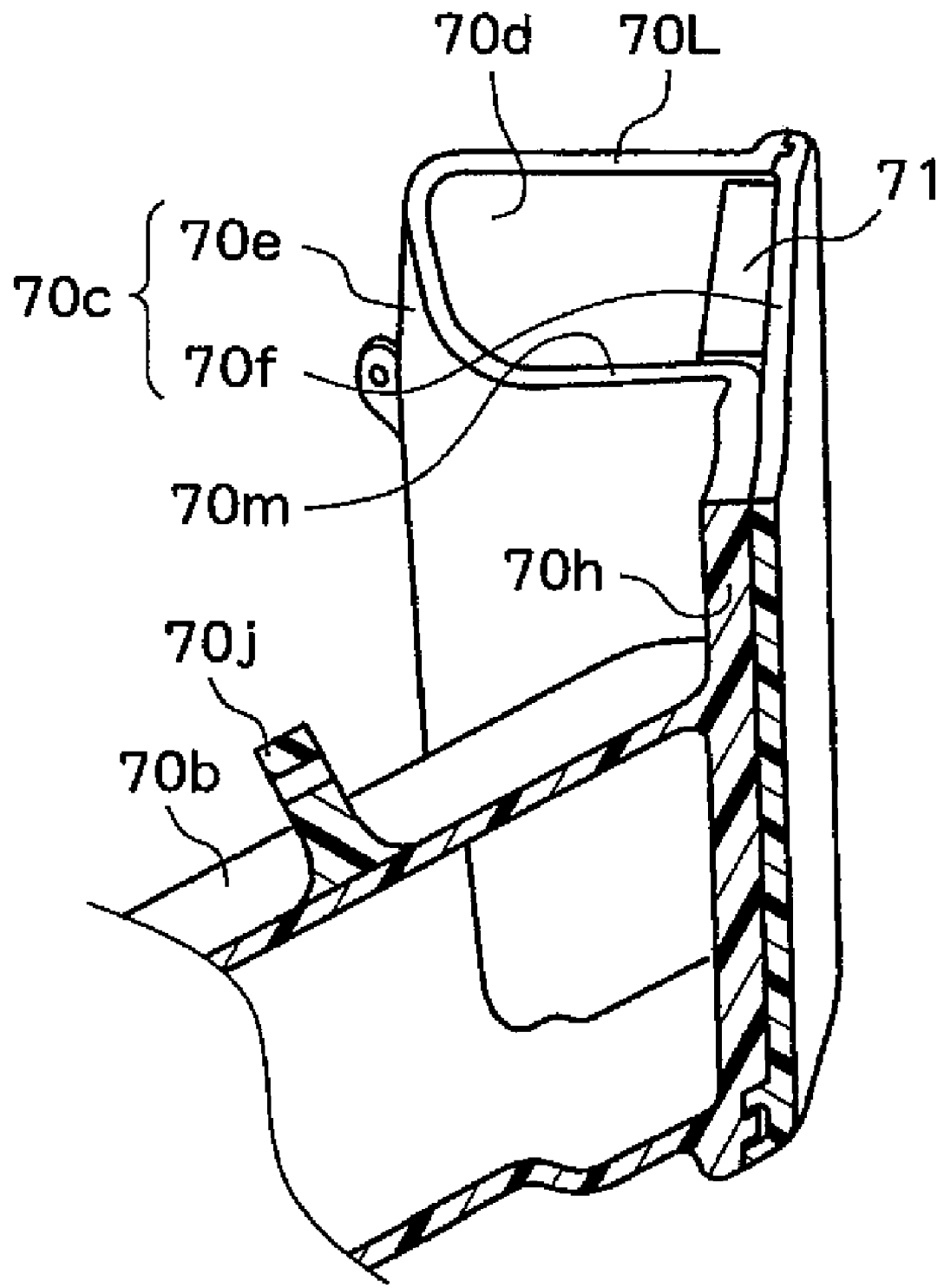
FIG. 9 is a sectional view taken along line IX-IX of FIG. 7.

FIG. 7 is a side view of air exhaust duct 70. FIG. 8 is a sectional view taken along line VIII-VIII of FIG. 5. FIG. 9 is a sectional view taken along line IX-IX of FIG. 7.

As shown in FIG. 8, air exhaust duct 70 includes a bent portion 70*a*, a slant portion 70*b* connecting to bent portion 70*a*; and an upward extended portion 70*c* connecting to slant portion 70*b*. The end portion of bent portion 70*a* is connected to air exhaust side end connection 50*b*, and bent portion 70*a* extends slightly upward from air exhaust side end connection 50*b* and then is bent to the central portion side in the vehicle width direction (direction W2 in FIG. 8). Slant portion 70*b* slants upward to the central portion side in the vehicle width direction from bent portion 70*a*, and its end portion is bent upward. Upward extended portion 70*c* extends upward and has air exhaust port 70*d* for exhausting air upward at its end portion. As shown in FIG. 8, air exhaust port 70*d* is shifted to the central portion side in the vehicle width direction with respect to air exhaust side end connection 50*b*. Moreover, as shown in FIG. 7, upward extended portion 70*c* is shifted rearward with respect to slant portion 70*b* and bent portion 70*a*.

As shown in FIG. 7, a rear wall portion 70L of upward extended portion 70*c* is higher than a front wall portion 70*m*. As shown in FIG. 5, air exhaust port 70*d* is slanted in such a way that its front side is lower than its rear side.

As shown in FIG. 8, upward extended portion 70*c* includes a cylindrical portion 70*e* formed in the shape of a cylinder having an open top surface and an open side surface and a cover portion 70*f*. Cover portion 70*f* closes the side surface of cylindrical portion 70*e* to construct cylindrical upward extended portion 70*c*. As shown in FIG. 7, plural (here, four) fixing portions 70*g* are formed on the circumferential edge of cylindrical portion 70*e*, and are fixed to cover portion 70*f* with bolts, for example. Cylindrical portion 70*e* and slant portion 70*b* are integrally molded of resin and bent portion 70*a* is formed of rubber or resin, for example.

A sound absorbing material 71 for reducing sound produced by the flow of air and noises produced by vibration of belt 33 is placed on the inside wall of upward extended portion 70*c*. As shown in FIG. 8, sound absorbing material 71 is placed on the inside wall of cover portion 70*f*, opposite to a direction D in which slant portion 70*b* extends (in the direction in which air flowing in slant portion 70*b* flows), of the inside wall of upward extended portion 70*c*. Sound absorbing material 71 may also function as a thermal insulating material for preventing the heat of air from being transmitted outside air exhaust duct 70 through the wall of air exhaust duct 70.

In this regard, as shown in FIGS. 7 and 9, slant portion 70*b* has a wall portion 70*h* formed on and erected upward from the outer peripheral surface of its front portion. Fixing portions 70*i*, 70*j* are formed and protrude sideward from an outside wall of air exhaust duct 70. As shown in FIG. 2, fixing portions 70*i*, 70*j* are fixed to brackets 2*p*, 2*q*, which are fixed respectively to stay 2*d* and seat rail 2*c*.

Air exhaust port 70*d*, which is positioned at the end portion of upward extended portion 70*c*, is positioned under storage case 8 (FIG. 2). Storage case 8 covers air exhaust port 70*d* from above and surrounds air exhaust port 70*d* from the side.

Figure 10:
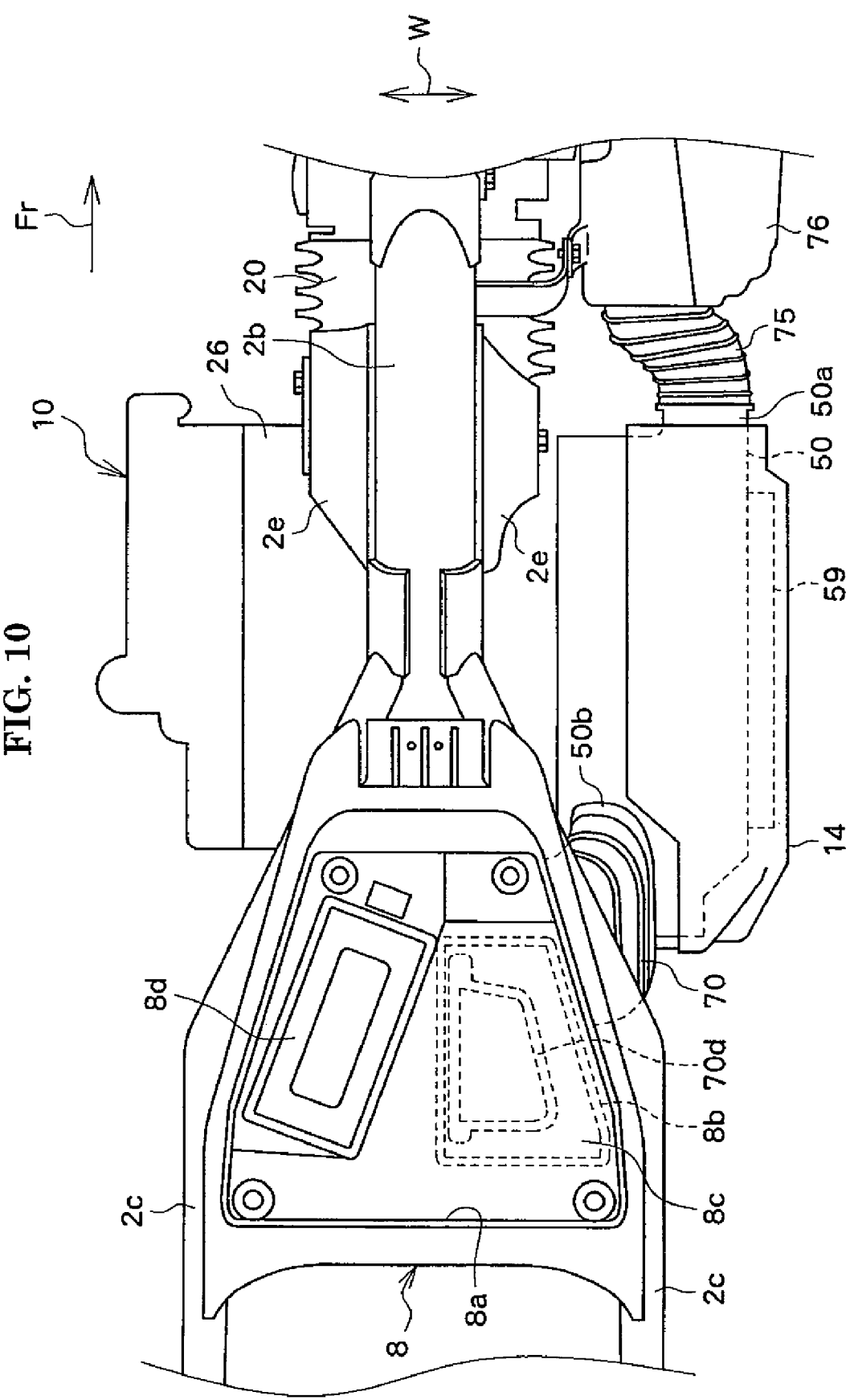
FIG. 10 is a plan view of a vehicle body frame to which a storage case is fixed and an engine unit.
Figure 11:
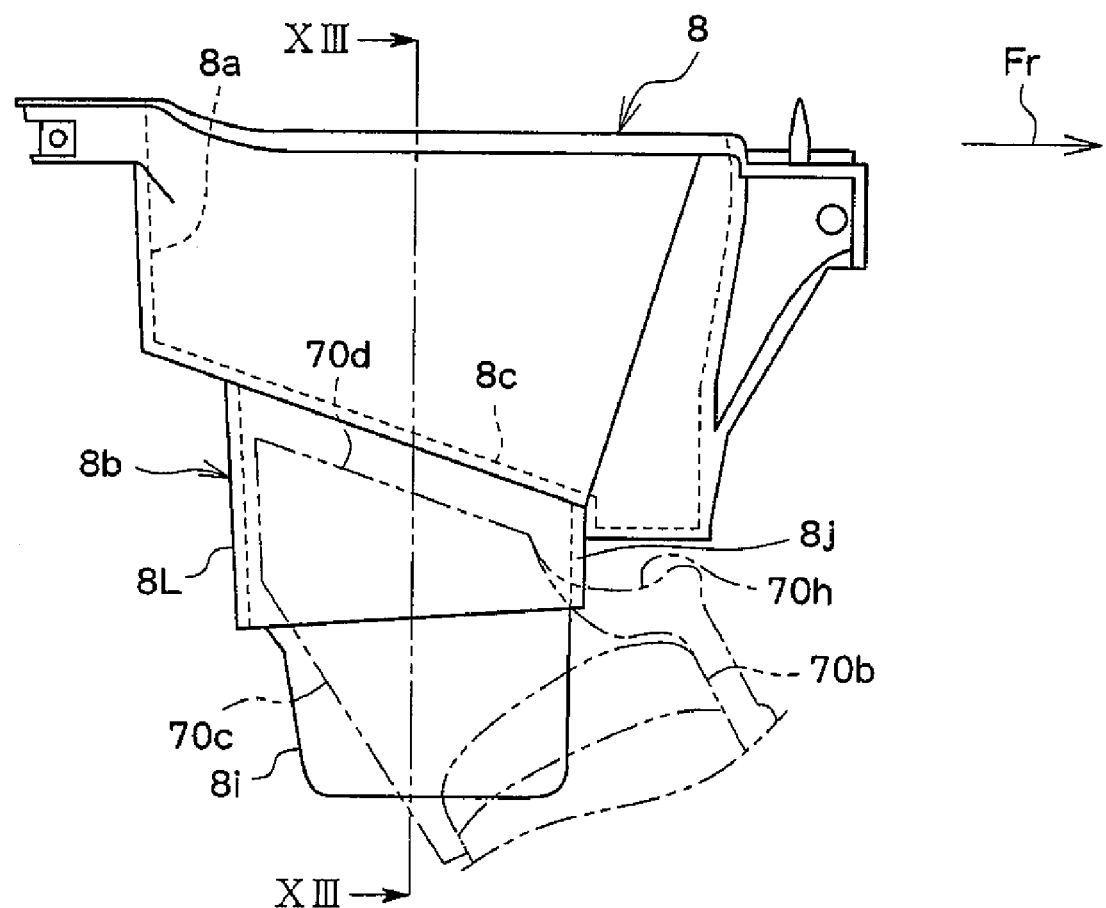
FIG. 11 is a side view of the storage case.
Figure 12:
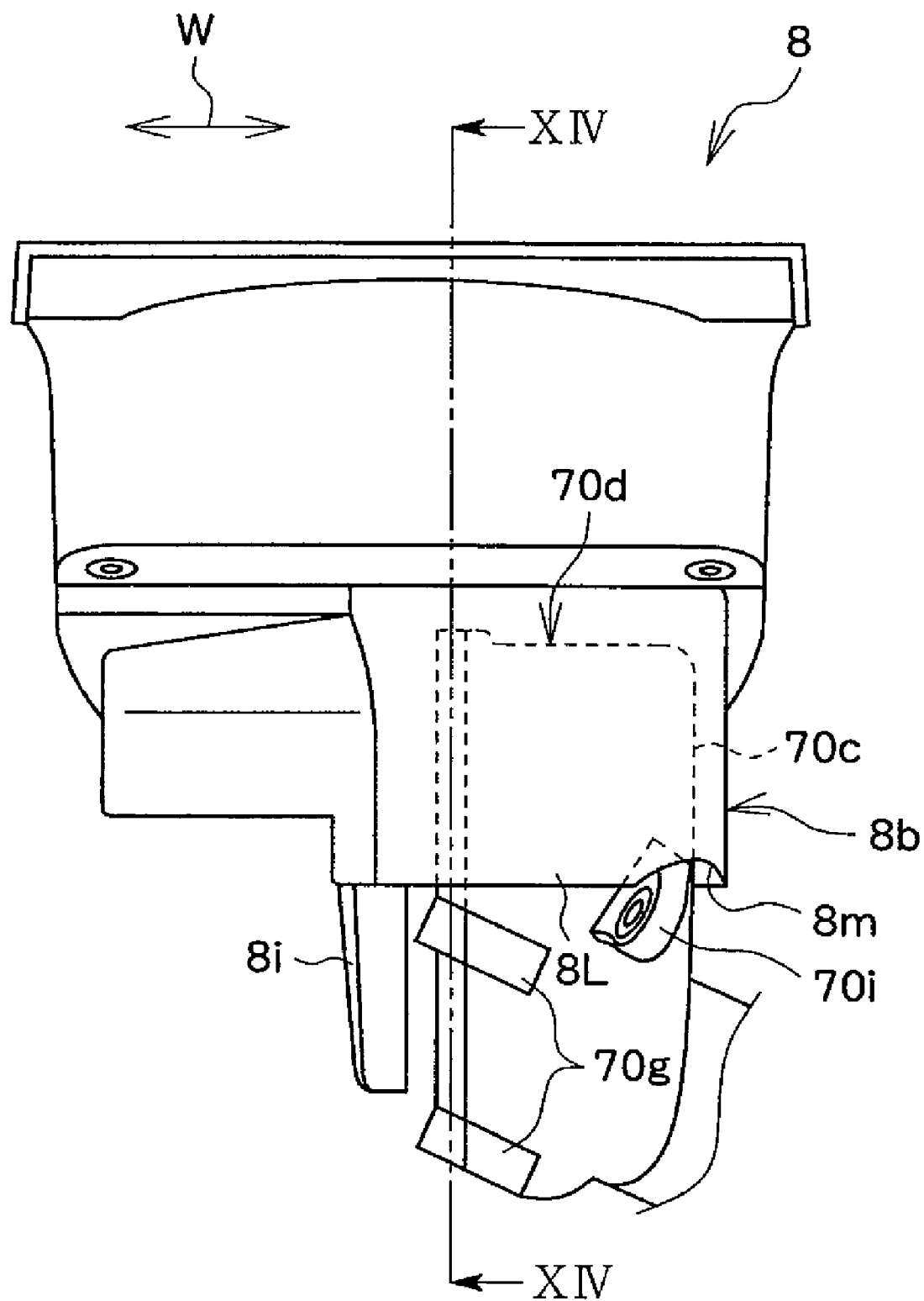
FIG. 12 is a rear view of the storage case.
Figure 13:
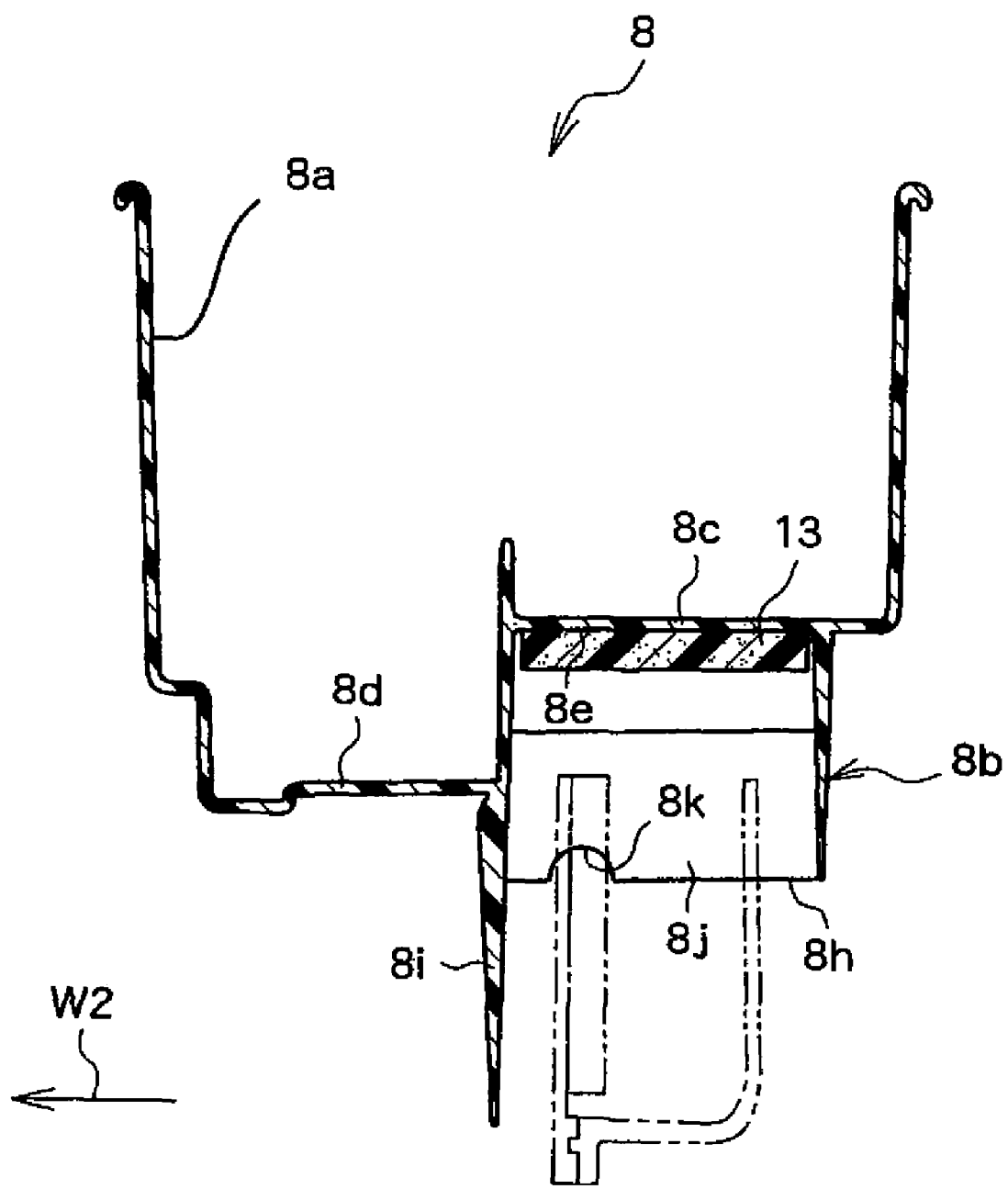
FIG. 13 is a sectional view taken along line XIII-XIII of FIG. 11.
Figure 14:
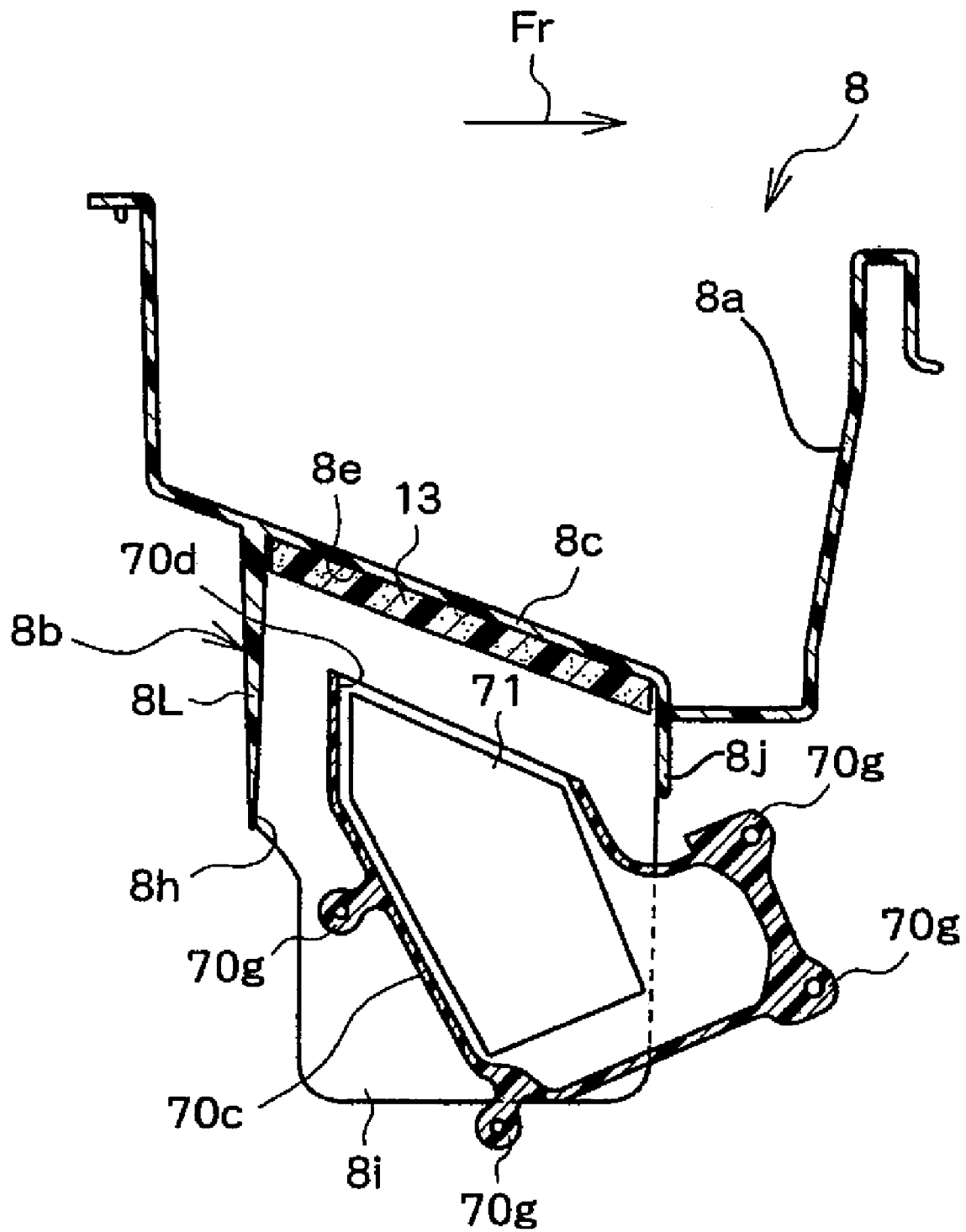
FIG. 14 is a sectional view taken along line XIV-XIV of FIG. 12.

FIG. 10 is a plan view of vehicle body frame 2 on which storage case 8 is mounted and engine unit 10. FIG. 11 is a side view of storage case 8. FIG. 12 is a rear view of storage case 8. FIG. 13 is a sectional view taken along line XIII-XIII of FIG. 11. FIG. 14 is a sectional view taken along line XIV-XIV of FIG. 12. Air exhaust duct 70 is shown in FIGS. 12 and 14, and is shown by a dashed and two dotted line in FIGS. 11 and 13.

As shown in FIGS. 10, 13 and 14, storage case 8 includes a storage portion 8*a* for storing goods and a surrounding wall portion 8*b* surrounding air exhaust port 70*d*.

Storage portion 8*a* is a box whose top portion is open. As shown in FIG. 10, storage portion 8*a* is formed in the shape of a trapezoid in a plan view and is narrower in width toward the front of motorcycle 1.

As shown in FIG. 14, a bottom wall portion 8*c* constructs the bottom of storage portion 8*a* and is slanted with respect to a horizontal plane such that its front side is lower than its rear side. As shown in FIGS. 10 and 13, a rectangular deep bottom wall portion 8*d* that is deeper (lower) than the other portion of bottom wall portion 8*c* is formed on the left side of bottom wall portion 8*c* and is disposed horizontally. Deep bottom wall portion 8*d* may have, for example, a battery mounted therein that supplies various electric parts mounted in the vehicle body with electric power.

Bottom wall portion 8*c* has a cover plane 8*e* disposed on its reverse surface opposite to and covering air exhaust port 70*d* from above (FIGS. 13 and 14). Cover plane 8*e* slants downward such that its front side is lower than its rear side, as in the case of bottom wall portion 8*c*, and is nearly parallel to air exhaust port 70*d*. Cover plane 8*e* has a thermal insulating material 13 placed thereon that prevents the heat of air exhausted from air exhaust port 70*d* from being transmitted to the interior of storage portion 8*a*.

Surrounding wall portion 8*b* extends downward from the reverse surface of bottom wall portion 8*c*. Bottom end edge 8*h* of surrounding wall portion 8*b* is positioned below the edge of air exhaust port 70*d*, and surrounding wall portion 8*b* surrounds air exhaust port 70*d* from the side (see FIGS. 13 and 14). A clearance is formed between the inner surface of surrounding wall portion 8*b* and upward extended portion 70*c* of air exhaust duct 70.

As shown in FIG. 13, an inside wall portion 8*i* of surrounding wall portion 8*b* positioned on the central portion side in the vehicle width direction (direction W2 in FIG. 13) is longer than the other wall portion. Inside wall portion 8*i* is positioned on the extension of the flow of air in slant portion 70*b* of air exhaust duct 70 and prevents the heat of air from being transmitted to the central portion side in the vehicle width direction. Moreover, a front side wall portion 8*j* of surrounding wall portion 8*b* positioned on the front side of air exhaust port 70*d* has a cutout 8*k* formed therein that prevents air exhaust duct 70 from interfering with wall portion 70*h*. As shown in FIG. 12, a rear wall portion 8L of surrounding wall portion 8*b* positioned on the rear side of air exhaust port 70*d* has a cutout 8*m* formed therein that prevents air exhaust duct 70 from interfering with a fixing portion 70*i*.

In motorcycle 1 described above, air exhaust duct 70 is connected to and extends upward from the top portion of transmission case 50. Air exhaust port 70*d* of air exhaust duct 70 is positioned above transmission case 50. With this configuration, heat exhaust efficiency in the transmission case is enhanced.

Moreover, in motorcycle 1, air exhaust duct 70 is bent at the middle portion thereof, and air exhaust port 70d of air exhaust duct 70 is shifted to the side with respect to air exhaust side end connection 50b of transmission case 50 to which air exhaust duct 70 is connected. Water or the like entering from air exhaust port 70d is thereby prevented from flowing to transmission case 50.

Moreover, in motorcycle 1, air exhaust port 70d is positioned more central in the vehicle width direction than air exhaust side end connection 50b. Dust or the like is thereby prevented from entering air exhaust port 70d from the exterior in the vehicle width direction.

Further, motorcycle 1 includes storage case 8 disposed under seat 9, and air exhaust port 70d of air exhaust duct 70 is positioned under bottom wall portion 8c of storage case 8. The heat of air exhausted from air exhaust port 70d is thereby not transmitted to seat 9.

Still further, in motorcycle 1, surrounding wall portion 8b surrounding air exhaust port 70d from the side is formed on bottom wall portion 8c of storage case 8. Dust or the like is thereby prevented from entering air exhaust port 70d.

Still further, motorcycle 1 includes bottom wall portion 8c of storage case 8 for covering air exhaust port 70d of air exhaust duct 70 from above. Dust or the like is thereby prevented from entering air exhaust port 70d from the exterior in the vehicle width direction. Moreover, thermal insulating material 13 is placed on cover plane 8e opposite to air exhaust port 70d of bottom wall portion 8c. The heat of air exhausted from air exhaust port 70d is thereby not transmitted to storage portion 8a of storage case 8.

Still further, in motorcycle 1, cover plane 8e opposite to air exhaust port 70d of bottom wall portion 8c is slanted with respect to the horizontal plane. Water and the like adhering to the cover plane 8e is thereby prevented from dropping in air exhaust port 70d.

Still further, in motorcycle 1, air exhaust port 70d is slanted such that its front side is lower than its rear side. Dust or the like is thereby prevented from entering air exhaust port 70d from the rear side.

Still further, in motorcycle 1, air exhaust side end connection 50b of transmission case 50 to which air exhaust duct 70 is connected is formed in the shape of an ellipsoid elongated in the front-and-rear direction of the vehicle body. The sectional area of the air exhaust side end connection can thus be enlarged without enlarging the width of transmission case 50.

Still further, in motorcycle 1, air exhaust side end connection 50b is formed in a cylindrical shape, and reinforcing part 50d extending in a direction intersecting a direction of extension of end connection 50b is formed inside of and internally reinforces end connection 50b. Air exhaust side end connection 50b is thereby not increased in thickness but is increased in strength. Moreover, the employment of a structure in which bolt 51 is passed through reinforcing part 50d makes it possible to arrange bolts for fixing transmission case 50 to crankcase 26 at equal intervals in the peripheral edge of transmission case 50 without being limited by the position of air exhaust duct 70. In other words, in general, a case for housing a continuously variable transmission is fixed to a crankcase with bolts, and holes are formed in the peripheral edge of the case. In this embodiment, as described above, reinforcing part 50d is formed inside air exhaust side end connection 50b and bolt 51 is passed through reinforcing part 50d. With this structure, even when transmission case 50 has end connection 50b formed therein, the positions of the bolts for joining transmission case 50 to crankcase 26 can be arranged at equal intervals. As a result, the hermeticity of transmission case 50 is increased and prevents water, dust, and the like from entering transmission case 50.

The present invention is not limited to motorcycle 1 described above but can be variously modified. For example, in the above description, storage case 8 is provided with cover plane 8e for covering air exhaust port 70d of air exhaust duct 70 and surrounding wall portion 8b surrounding air exhaust port 70d. However, a part different from storage case 8 may be arranged above air exhaust port 70d and may be provided with a cover plane for covering air exhaust port 70d and a surrounding wall part for surrounding air exhaust port 70d.

As noted above, the present invention includes various embodiments that are not specifically described herein. Accordingly, the scope of the invention is determined with reference to the following claims.

The invention claimed is:

1. A straddle-type vehicle comprising:
 a belt-type continuously variable transmission and an engine arranged forward of a rear wheel;
 a main frame arranged to support the engine;
 a seat rail connected to the main frame;
 a seat and a storage case supported by the seat rail, the storage case being disposed under the seat;
 a transmission case housing the continuously variable transmission;
 an air intake duct for introducing outside air into the transmission case; and
 an air exhaust duct for exhausting air from the transmission case, wherein
 the air exhaust duct is connected to and extends upward from a top portion of the transmission case, and includes an air exhaust port positioned above the transmission case;
 the air exhaust duct extends from the to portion of the transmission case toward an inside of the vehicle in a vehicle width direction, and through a space between the main frame and the seat rail in a side view of the vehicle; and
 at least a portion of the exhaust port of the air exhaust duct overlaps with the storage case in a top view of the vehicle.

2. The straddle-type vehicle as claimed in claim 1, wherein a middle portion of the air exhaust duct is bent and the air exhaust port is shifted to a side with respect to an end connection of the transmission case to the air exhaust duct.

3. The straddle-type vehicle as claimed in claim 2, wherein the air exhaust port is more central in the vehicle width direction than the end connection of the transmission case.

4. The straddle-type vehicle as claimed in claim 1, wherein
 the air exhaust port is positioned below a bottom wall of the storage case.

5. The straddle-type vehicle as claimed in claim 4, wherein a wall portion surrounding the air exhaust port from a side is formed on the bottom wall of the storage case.

6. The straddle-type vehicle as claimed in claim 1, further comprising a part covering the air exhaust port from above.

7. The straddle-type vehicle as claimed in claim 6, wherein a thermal insulating material is disposed on a surface of the part opposite to the air exhaust port.

8. The straddle-type vehicle as claimed in claim 6, wherein a surface of the part opposite to the air exhaust port is slanted with respect to a horizontal plane.

9. The straddle-type vehicle as claimed in claim 1, wherein the air exhaust port is slanted such that a front side of the air exhaust port is lower than a rear side of the air exhaust port.

10. The straddle-type vehicle as claimed in claim 1, wherein an end connection of the transmission case to which the air exhaust duct is connected has a section in a shape of an ellipsoid elongated in a front-and-rear direction of the vehicle.

11. The straddle-type vehicle as claimed in claim 1, wherein an end connection of the transmission case to which the air exhaust duct is connected is formed in a cylindrical shape and has a reinforcing part disposed therein extending in a direction intersecting a direction of extension of the end connection and internally reinforcing the end connection.

12. The straddle-type vehicle as claimed in claim 1, wherein the straddle-type vehicle is a motorcycle.

* * * * *